May 7, 1929.  P. KRUZEL  1,712,115

ANIMAL TRAP

Filed Aug. 12, 1927

INVENTOR
Piotr Kruzel
BY
ATTORNEY

Patented May 7, 1929.

1,712,115

UNITED STATES PATENT OFFICE.

PIOTR KRUZEL, OF CHICAGO, ILLINOIS.

ANIMAL TRAP.

Application filed August 12, 1927. Serial No. 212,453.

This invention relates generally to mouse traps, the invention having more particular reference to a novel type of mouse trap.

The invention has for an object, the provision of an improved mouse trap of novel construction and arrangement of parts.

For further comprehension of the invention, and of the objects and advantages thereof, reference will be had to the following description and accompanying drawing and to the appended claims in which the various novel features of the invention are more particularly set forth.

Fig. 1, of the drawing is a side elevational view of my improved mouse trap.

Figure 1:
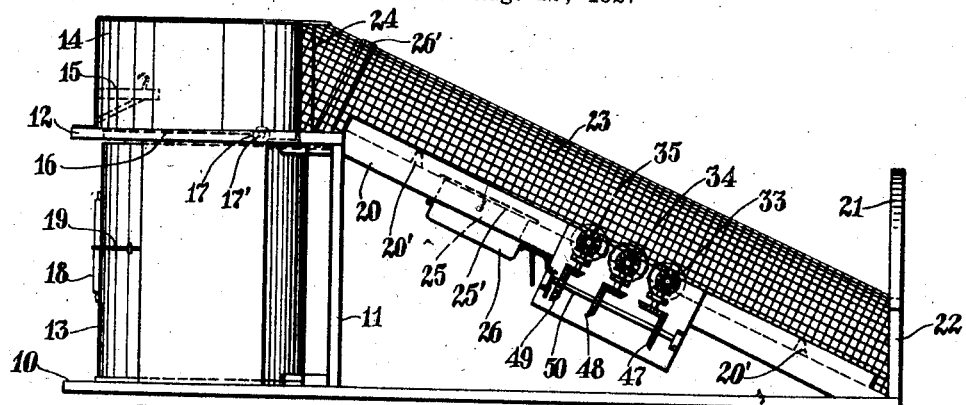
Figure 2:
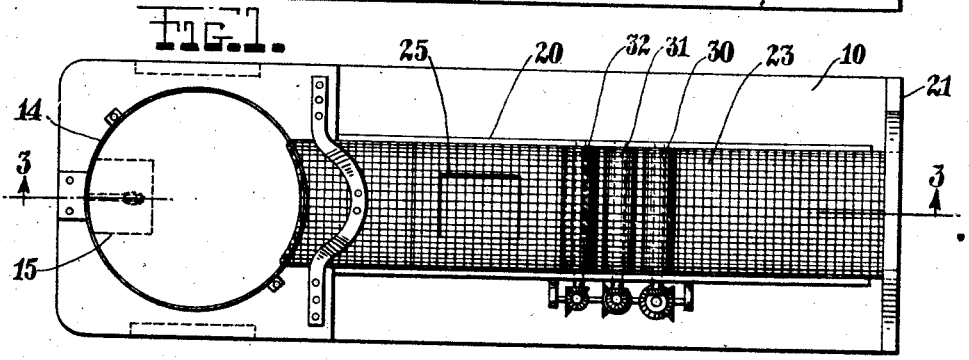
Fig. 2, is a top plan view thereof.

As herein embodied my improved mouse trap comprises a base 10, provided with an upright member 11 having an upper member 12, adapted to support a trap proper 13, preferably a hollow cylindrical member, positioned on the base 10 and extending upward therefrom. The upright member 12 is also adapted to support a bait member 14, preferably a hollow cylindrical member, positioned on the upper member 12, directly above the trap proper 13. The bait member 14 is provided with a horizontal member 15, adapted to support or hold any suitable bait, such as cheese or the like.

Figure 3:
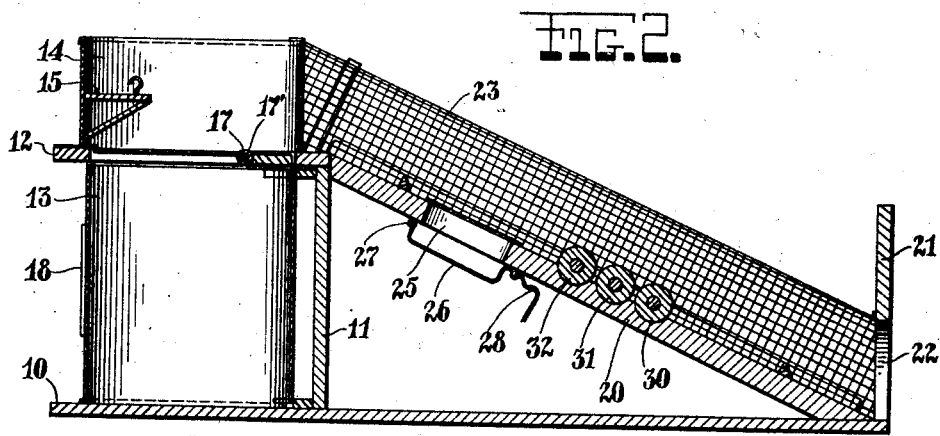
Fig. 3, is a longitudinal central sectional view taken on the line 3—3 of Fig. 2.

The upper member 12 is provided with an aperture to accommodate a hinged member 16 hinged or pivoted thereto, as at 17, and of suitable size to entirely enclose or cover the said aperture. The spring 17' is adapted to normally hold the hinged member 16, in a horizontal position, as shown in Figs. 1 and 3. The trap member 13 is provided with a door 18 slidably attached thereto, and having a catch 19, as a means of holding the said door 18, in a closed position.

The inclined member 20, is attached at its lower extremity to the base 10 and extends therefrom at any suitable angle to the upper member 12 and is attached thereto.

The entrance member 21, is attached to the base, adjacent to the lower extremity of the inclined member 20, and extends upward therefrom, and is provided with an aperture 22. The cross pieces 20', preferably wedge shaped, are attached to the inclined member 20 and extend across the inclined member, so as to give footage to a mouse running up the inclined member, 20. The screen 23 preferably fine wire mesh or the like, suitably attached to the entrance member 21, the bait member 14, and to the sides of the inclined member 20, and adapted to enclose the above mentioned members, so as to form an enclosure preferably semicircular shaped. The stay member 26' is attached to the upper member 12 and is formed or bent so as to brace or support the screen 23. It being understood that the bait member 14 is provided with an aperture 24, enclosed by the said screen 23. The inclined member 20 is provided with an aperture 25 located at or near the upper extremity thereof, and enclosed by a container 26, adapted to hold bait, cheese or the like, hinged thereto as at 27, and provided with a suitable catch 28, as a means of holding the container 26 in a closed position. The porous member 25, preferably a screen or the like, is adapted to cover the aperture 25.

The above described construction being such as will permit a mouse to enter through the said entrance member 21, and run or climb up the inclined member 20, and jump or step upon the hinged member 16, which will cause the said mouse to fall into the trap proper 13 where the mouse will remain until removed.

Figure 4:
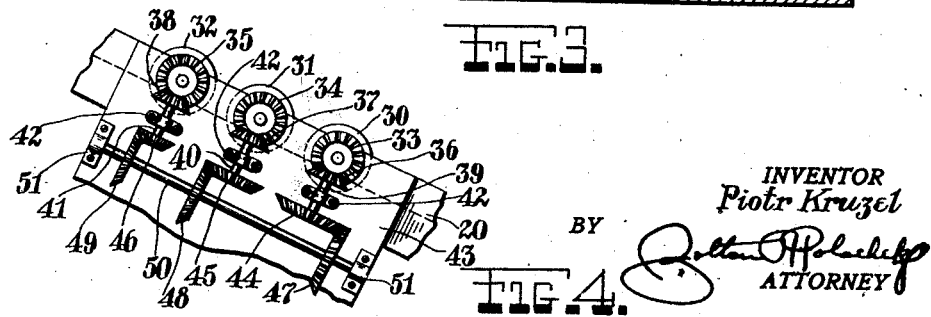
Fig. 4, is enlarged side elevational detail view of the gearing mechanism as used in combination with my improved device.

The rollers 30, 31 and 32 are rotatably attached at their extremities to the inclined member 20, and extend crosswise thereto, and are positioned at or near the center of the said inclined member 20. The bevel pinions 33, 34 and 35, are attached at one of the extremities of the rollers 30, 31 and 32 respectively and mesh in the bevel pinions 36, 37 and 38, attached to the shafts 39, 40 and 41 respectively, rotatively supported in suitable brackets 42 attached to the plate member 43, supported by the inclined member 20. The bevel pinions 44, 45 and 46, are attached to the shafts 39, 40 and 41 respectively, and mesh with bevel pinions 47, 48, and 49, attached to the shaft 50, driven by any suitable means not shown on the drawing, and rotatively supported in the suitable brackets 51 attached to the plate member 43. It being understood that the said bevel pinions 44, 45 and 46 are of different pitch diameters, so as to increase the speed of the roller 31, relative to the speed of the roller 30, and so as to increase the speed of the roller 32 relative to the speed of the roller 31. It should be understood that the roller 30 will be rotated clockwise when a mouse steps thereon in climbing the incline and that by virtue of the gearing shown in Fig. 4, the other two rollers will be rotated in an anticlockwise direction for the bevel gear 47 of the roller 30 is on the opposite side of its pinion relative to the bevel gears 49 and 50 and their pinions.

The above described construction, being such as will force or push a mouse stepping in the roller 30, on to the rollers 31 and 32, so as to urge the said mouse onward, up the said inclined member 20, into the said bait member 14.

While I have above described the preferred form, construction, and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:—

1. In a device of the class described, a runway having an entrance end, rollers rotatively mounted on the runway in a longitudinal row, bevel gears attached to one end of each roller, bevel pinions meshing with the gears and fixed on shafts rotatively mounted, other bevel pinions of different pitch diameter relative to each other, fixed on the shafts with the last mentioned bevel pinions, the pinions of different pitch diameters being arranged in successively diminishing diameters relative to the entrance end of the runway, and a shaft with gears meshing with the pinions of different diameters for communicating rotation from the roller nearest the said entrance end to the other rollers in increased rapidity.

2. In a device of the class described, a runway having an entrance end, rollers rotatively mounted on the runway in a longitudinal row, bevel gears attached to one end of each roller, bevel pinions meshing with the gears and fixed on shafts rotatively mounted, other bevel pinions of different pitch diameter relative to each other, fixed on the shafts with the last mentioned bevel pinions, the pinions of different pitch diameters being arranged in successively diminishing diameters relative to the entrance end of the runway, and a shaft with gears meshing with the pinions of different diameters so that as the roller nearest the said entrance is turned rearwards, the other rollers turn forwards for communicating rotation from the roller nearest the said entrance end to the other rollers in increased rapidity for urging an animal onwards.

In testimony whereof I have affixed my signature.

PIOTR KRUZEL.